(12) United States Patent
Sato et al.

(10) Patent No.: US 8,760,734 B2
(45) Date of Patent: Jun. 24, 2014

(54) IMAGE FORMING APPARATUS

(71) Applicant: Canon Kabushiki Kaisha, Tokyo (JP)

(72) Inventors: Kuniaki Sato, Yokohama (JP); Masaya Shimmachi, Kawasaki (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/733,769

(22) Filed: Jan. 3, 2013

(65) Prior Publication Data

US 2013/0188230 A1 Jul. 25, 2013

Related U.S. Application Data

(63) Continuation of application No. 12/187,369, filed on Aug. 6, 2008, now Pat. No. 8,368,973.

(30) Foreign Application Priority Data

Aug. 10, 2007 (JP) ................................. 2007-209600

(51) Int. Cl.
*H04N 1/04* (2006.01)
*B65H 7/02* (2006.01)
*B65H 3/52* (2006.01)
*H04N 9/64* (2006.01)
*G03G 15/00* (2006.01)

(52) U.S. Cl.
USPC ...... 358/486; 271/258.01; 271/121; 348/247; 399/88; 399/388

(58) Field of Classification Search
USPC ........ 271/258.01, 121; 348/247; 399/88, 388; 358/486

See application file for complete search history.

*Primary Examiner* — Charlotte M Baker
*Assistant Examiner* — Rury Grisham
(74) *Attorney, Agent, or Firm* — Canon USA Inc. IP Division

(57) ABSTRACT

An image reading apparatus includes a sheet feeding unit configured to sequentially feed documents loaded on a document positioning plate, a reading sensor configured to read a document of the plurality of documents fed by the sheet feeding unit, an acquisition unit to acquire an interval of the document between a trailing edge of a preceding document and a leading edge of a next document conveyed through the conveyance path, and a reading unit to execute a first reading mode using the reading sensor to read the document conveyed at a first conveyance speed, and a second reading mode using the reading sensor to read the document conveyed at a second conveyance speed that is lower than the first conveyance speed, wherein the reading unit executes the second reading mode after the first reading mode when the interval of the document is less than a predetermined interval.

5 Claims, 10 Drawing Sheets

IMAGE FORMING APPARATUS

CROSS-REFERENCE TO RELATED APPLICATIONS

This application is a continuation of application Ser. No. 12/187,369 filed Aug. 6, 2008 that claims the benefit of Japanese Patent Application No. 2007-209600 filed Aug. 10, 2007, all of which are hereby incorporated by reference herein in their entirety.

BACKGROUND OF THE INVENTION

1. Field of the Invention

The present invention relates to an image forming apparatus, more specifically an image forming apparatus including an image reading apparatus.

2. Description of the Related Art

Conventionally, an image reading apparatus such as a scanner or an image forming apparatus such as a copy machine and facsimile use a document conveyance apparatus that conveys a plurality of documents sheet-by-sheet. The document conveyance apparatus reads a document with a fixed reading sensor according to position information obtained from a detecting unit that is provided in a document conveyance path to detect leading and trailing edges of the document. The document conveyance apparatus discussed in Japanese Patent Application Laid-Open No. 7-196181 detects an interval between the document being read and the next document, and actively controls the interval to be predetermined length. In the document conveyance apparatus discussed in Japanese Patent Application Laid-Open No. 7-251981, an interval between the document being read and the next document is set to be wider than an interval between the position where the reading sensor reads the document and the position where leading and trailing edges of the document are detected.

However, the document conveyance apparatus discussed in Japanese Patent Application Laid-Open No. 7-196181 requires a plurality of drive sources, thus cannot be realized with a single drive source. Furthermore, the document conveyance apparatus discussed in Japanese Patent Application Laid-Open No. 7-196181 cannot shorten a conveyance interval more than prescribed in order to secure an interval between a document and a subsequent document even when the document interval varies.

Even if the aforementioned mechanism operates to convey the document at a constant interval, an interval between the documents varies. For example, a roller that conveys the documents can slip and cause variation in the amount of the documents pulled out when the document is fed.

SUMMARY OF THE INVENTION

An embodiment of the present invention is directed to a document conveyance apparatus that changes a method for reading a next document according to an interval between documents, so that the apparatuses and manufacturing costs can be reduced. Another embodiment of the present invention is directed to an image reading apparatus and an image forming apparatus equipped with the document conveyance apparatus.

According to an aspect of the present invention, an image reading apparatus includes a sheet feeding unit configured to sequentially feed a plurality of documents loaded on a document positioning plate, a reading sensor arranged in a conveyance path configured to read a document of the plurality of documents fed by the sheet feeding unit, an acquisition unit configured to acquire an interval of the document between a trailing edge of a preceding document and a leading edge of a next document conveyed through the conveyance path, and a reading unit configured to execute a first reading mode using the reading sensor to read the document conveyed at a first conveyance speed, and a second reading mode using the reading sensor to read the document conveyed at a second conveyance speed that is lower than the first conveyance speed, wherein the reading unit executes the second reading mode after the first reading mode when the interval of the document is less than a predetermined interval.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

An image reading apparatus may be included in an image forming apparatus body such as a copy machine, a printer, a facsimile and a multifunction peripheral including the above apparatuses as a part of component. In this case, the image information read by an image reading apparatus is formed on a sheet as an image by an image forming unit of the image forming apparatus. That is, an image read by an image reading apparatus is copied on a sheet by an image forming unit, and the image is transmitted to an external apparatus through a communication unit.

First Exemplary Embodiment

In the first exemplary embodiment of the present invention, an auto-sheet feeding reading apparatus is described as an example of an image reading apparatus equipped with a sheet conveyance apparatus.

Figure 1:
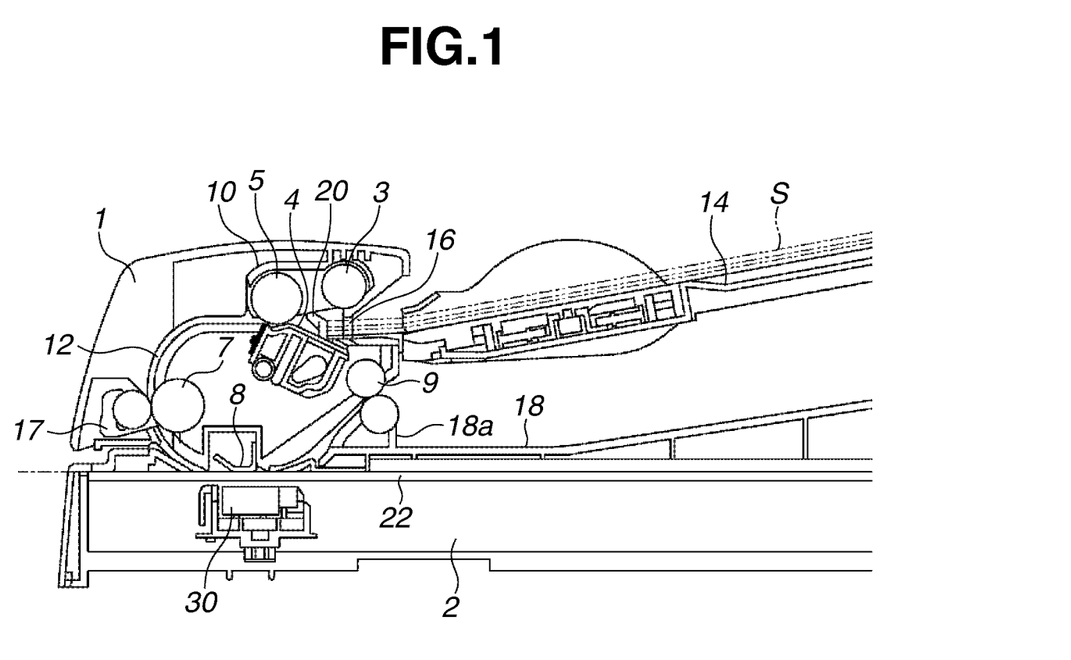
FIG. 1 is a cross-sectional view illustrating an auto-sheet feeding reading apparatus according to an exemplary embodiment of the present invention.

FIG. 1 is a cross-sectional view illustrating an auto-sheet feeding reading apparatus according to the exemplary embodiment. As illustrated in FIG. 1, a document reading conveyance unit 1 has a document conveyance path 12 in U-shape (hereinafter, referred to as U-turn path) within an auto-sheet feeding pressure plate unit 40 (refer to FIG. 2). A separation roller 5, a separation pad 4, a document presence sensor 16, a first conveyance roller 7 for conveying a document S, and a document edge sensor 17 are disposed on the U-turn path 12. The document sensor 16 detects presence or absence of the document S. The document edge sensor 17 detects the leading edge and the trailing edge of the document S. The auto-sheet feeding reading apparatus has one drive source for conveying documents, that is a motor M as illustrated in FIG. 3.

A document positioning plate (document positioning tray) 14 is mounted so as to be connected to an upstream edge side of the U-turn path 12. A document discharge tray 18 which serves also as a pressing plate is mounted at a downstream edge side of the U-turn path 12 on the document reading conveyance unit 1. A document holding surface 18a for holding the trailing edge of the discharged document is formed at a base edge side of the document discharge tray 18. In FIG. 1, the document S is first fed in a left direction, and conveyed through the U-turn path 12 to make a U-turn. Then, the document S is delivered in a right direction and discharged onto the document discharge tray 18.

The U-turn path 12 includes a document stopper 20, the document presence sensor 16 and a pickup roller 3 on the upstream edge side. The U-turn path 12 further includes the separation roller 5 and the separation pad 4 that are press-contacted to each other in order to separate the document S picked up by the pickup roller 3 into one sheet on the upstream edge side. The second conveyance roller 9 for discharging the document S onto the document discharge tray 18 is disposed on the downstream edge side of the U-turn path 12. The document stopper 20 regulates the leading edge position of the documents S loaded onto the document positioning tray 14. The pickup roller 3 contacts the upper most sheet of the loaded documents S and picks up the sheet. A structure equipped with the pickup roller 3, the separation roller, the separation pad 4, the document stopper 20 and a pickup arm 10 is referred to as a paper feeding unit.

A fixed reading unit 2 reads the document S placed on a glass 22. The document reading conveyance unit 1 and a contact image sensor 30 which are disposed across the glass 22 irradiate an image information surface of the document S with light from a light emitting diode (LED) alley serving as a light source, and forms an image with light reflected on the image information surface with a SELFOC Lens® in sensor elements which read out the image information. The sensor elements convert the reflected light into electric signals with photoelectric conversion elements. The sensor elements include a charge storage unit storing electric charges converted by the photoelectric conversion elements.

The contact image sensor 30 is configured to be movable in a longitudinal direction in FIG. 1. The contact image sensor 30 scans and reads a document loaded on the glass 22 in FIG. 1 from the left side to the right side when the fixed document is read. In a case where the document reading conveyance unit 1 reads the documents, the contact image sensor 30 reads documents conveyed to the reading position while stopping at the reading position (a facing position of a reading white plate 8) in FIG. 1.

Figure 2:
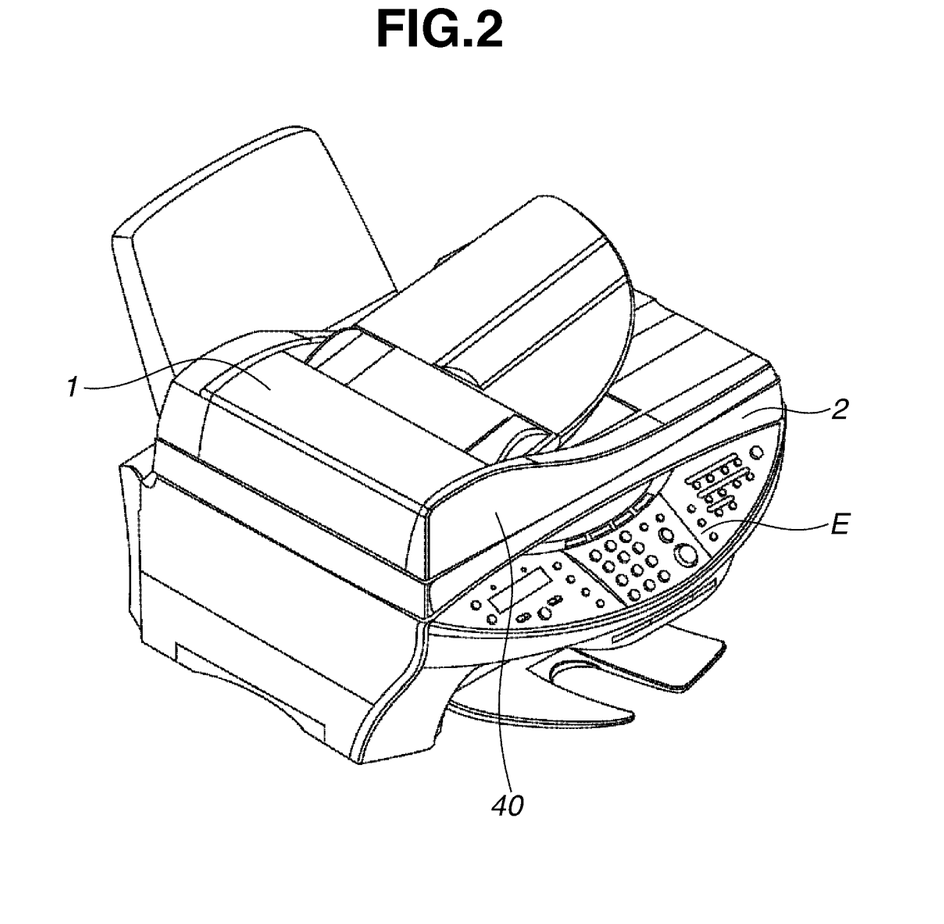
FIG. 2 is a perspective view illustrating an auto-sheet feeding reading apparatus according to the exemplary embodiment of the present invention.
Figure 3:
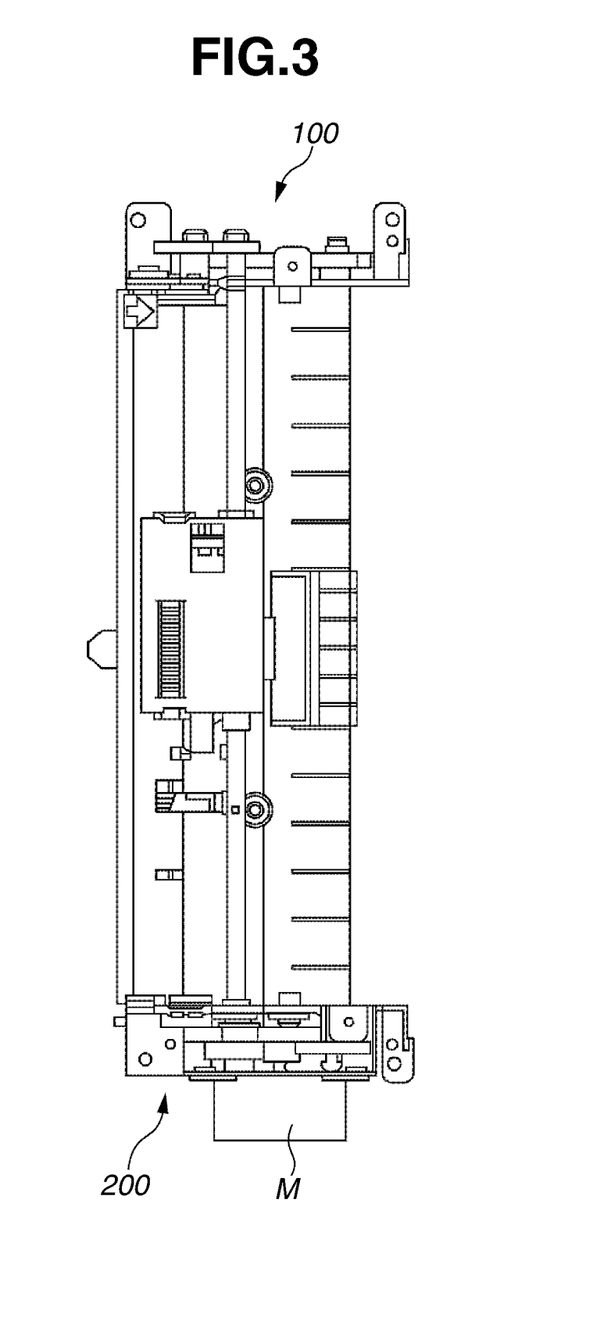
FIG. 3 is a diagram illustrating a driving system according to the exemplary embodiment of the present invention.

FIG. 2 is a perspective view illustrating an auto-sheet feeding reading apparatus according to the exemplary embodiment. The auto-sheet feeding reading apparatus includes the document reading conveyance unit 1, the fixed reading unit 2, an auto-sheet feeding pressure plate 40 that opens and closes a cover for fixed reading, and an operation unit E.

FIG. 3 is a diagram illustrating a part of the auto-sheet feeding reading apparatus viewed from the top. The auto-sheet feeding reading apparatus further includes the reading-conveyance drive unit 200, the separation-conveyance drive unit 100, and a driving motor M. As FIG. 3 illustrates, the drive units are mounted at both edges of the reading-conveyance drive unit 200. That is, the reading-conveyance drive unit 200 is a drive transmission unit disposed at the side of the drive motor M as clearly shown in the FIG. 3. The separation-conveyance drive unit 100 is a drive transmission unit disposed at the opposite side of the drive motor M. As illustrated in FIG. 3, a paper feeding unit is provided between the separation-conveyance drive unit 100 and the reading-conveyance drive unit 200.

Figure 4:
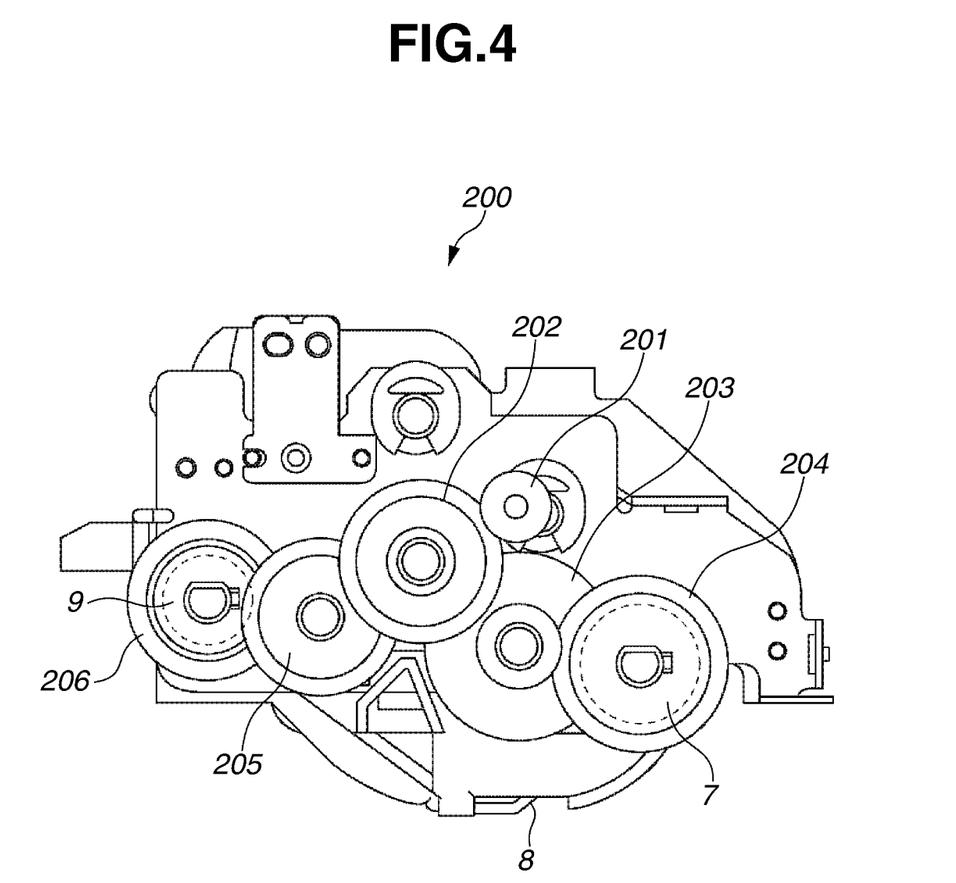
FIG. 4 is a diagram illustrating a reading conveyance drive unit according to the exemplary embodiment of the present invention.

The reading conveyance drive unit 200 is described by referring to FIG. 4. Dash lines in FIG. 4 illustrate the first conveyance roller 7 and the second conveyance roller 9, which are closest to the reading unit (reading position) that is equipped with the reading white plate 8. The first conveyance roller 7 and the second conveyance roller 9 are respectively arranged at the upstream side and the downstream side. These two rollers 7 and 9 perform reading-conveyance control. A drive gear 204 of the first conveyance roller 7 is driven by a pinion gear 201 of the motor M via intermediate gears 202 and 203. A drive gear 206 of the second conveyance roller 9 is driven by the pinion gear 201 of the motor M via intermediate gears 202 and 205. The drive transmitting unit at the drive motor side drives only the conveyance rollers 7 and 9 for reading control which are closest to the reading unit and arranged at the upstream and downstream sides so that highly fine reading-conveyance is realized.

Figure 5:
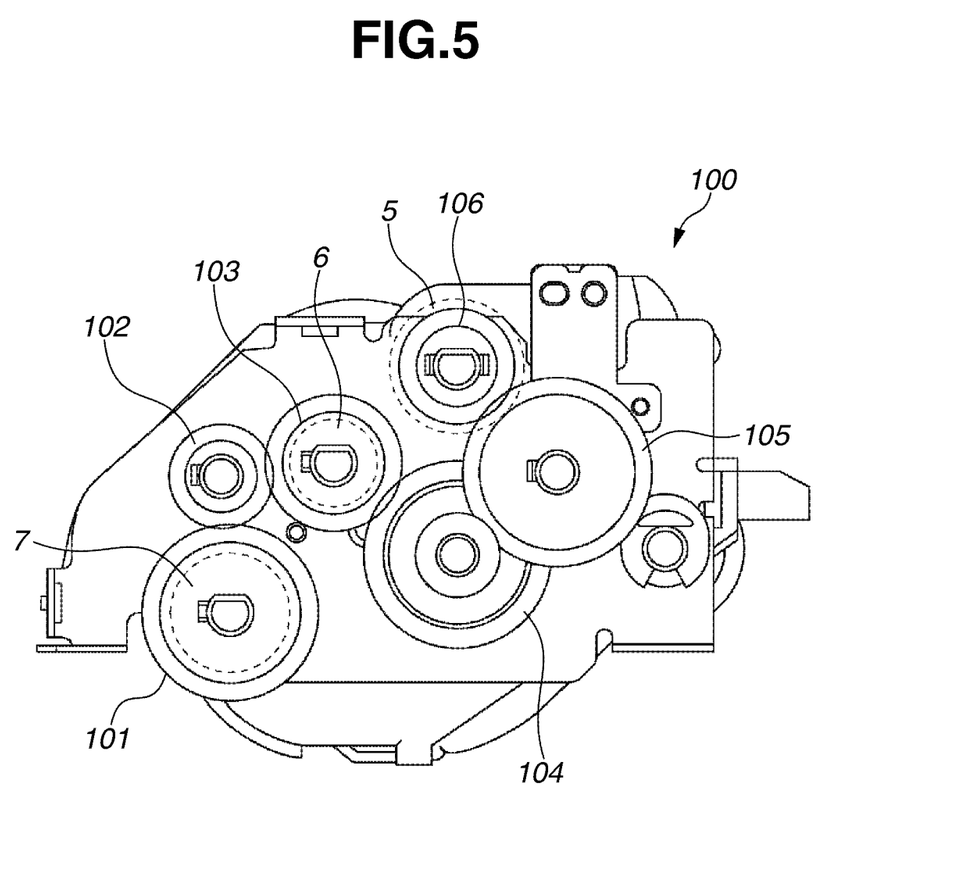
FIG. 5 is a diagram illustrating a separation conveyance drive unit according to the exemplary embodiment of the present invention.

Next, the separation-conveyance drive unit 100 is described by referring to FIG. 5. Dash lines in FIG. 5 represent a separation roller 5 and the first conveyance roller 7. A drive gear 106 of the separation roller 5 is driven by the first drive gear 101 via intermediate gears 102, 103, 104 and 105. The drive transmitting unit at the opposite side of the drive motor is driving the separation-conveyance rollers. Thus, the separation-conveyance rollers are driven without affecting the rollers performing reading control.

Figure 9:
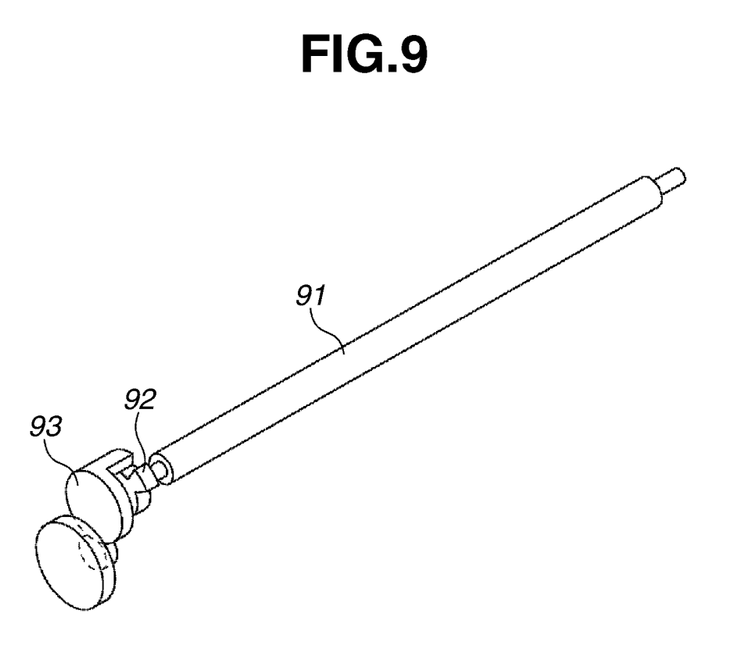
FIG. 9 is a diagram illustrating a driving system according to the exemplary embodiment of the present invention.

A drive unit (mechanical timer) is mounted between the reading-separation roller 5 and the drive system within the pickup arm 10 (not shown). The drive unit delays startup of the drive a predetermined time. The structure hereof is described by referring to FIG. 9. The structure includes a roller 91, a roller output member 92, and a gear 93. As illustrated in FIG. 9, the roller output members 92 and 93 respectively have protruding portions. When the gear 93 rotates in a rotational direction, the roller 91 does not rotate while the protruding portion of the gear 93 is separate from the protruding portion of the roller output member 92. The roller 91 first starts to rotate when the protruding portion of the gear 93 abuts the protruding portion of the roller output member 92. This structure is referred to as a mechanical timer.

The image surface of the document S is placed facing upward in the document reading conveyance unit 1 in FIG. 1.

When setting the document S, the document stopper 20 controls positioning of the leading edge of the document S, and the document presence sensor 16 detects the presence of the documents S.

The motor M starts rotating when an operator sets the first document reading mode from the operation unit E and instructs to start reading. Driven by the motor M, the pickup arm 10 presses down the document stopper 20 and the separation roller 5 starts to rotate after idling owing to the mechanical timer. After that, the pickup roller 3 starts to rotate. By these operations, the documents S are fed to the inside of the U-turn path 12 through a slope of the document stopper 20. By setting the idling time as described above, a timing interval for feeding the documents is secured.

At this time, the separation roller 5 and the separation pad 4 separate the documents S one by one, and the top sheet of the documents S is separated and conveyed in the document reading-conveyance unit 1. When the separated document S is conveyed along the U-turn path 12 and further fed into the first conveyance roller 7, the document S starts to be conveyed by the friction. The circumferential speed of the separation roller 5 is relatively slower than the circumferential speed of the first conveyance roller 7 at the time. Since the mechanical timer which is not illustrated herein is connected to the separation roller 5, conveyance of the first conveyance roller 7 does not become a load to the separation roller 5.

The mechanical timer (not shown) connected to the separation timer 5 is gradually charged by the circumferential speed difference between the first conveyance roller 7 and the separation roller 5. The circumferential speed difference and the amount of mechanical timer may not be set so as to be fully charged irrespective of the size of the document S. Otherwise, clutch member may be inserted to the mechanical timer unit. The clutch member slips even when the mechanical timer is fully charged so that the separation roller 5 does not become a load to the first conveyance roller 7.

When a document edge sensor 17 detects the leading edge of the documents S in the document reading conveyance unit 1, the contact image sensor 30 starts reading image information at a position where a predetermined amount is conveyed from the position where the leading edge is detected.

This reading operation is executed in the first document reading mode while conveying the documents. The document is pressed to the reading white plate 8 at the startup time of reading operation. After the reading operation is started, the leading edge of the documents proceeds to the second conveyance roller 9. When the document edge sensor 17 detects the trailing edge of the documents S, the contact image sensor 30 finishes reading of the image information at a position where a predetermined amount is conveyed from the position where the trailing edge is detected.

The document is conveyed following the preceding document when the document presence sensor 16 detects the presence of the document. Using the document edge sensor 17, information about an interval between two sheets of documents to be conveyed (i.e., the information about an interval between the trailing edge of the preceding document and the leading edge of the document following the preceding documents) is acquired. For example, the information about an interval is acquired using the document edge sensor 17 based on pulse numbers of the motor from when the trailing edge of the preceding document is detected until when the leading edge of the next document is detected by the document edge sensor 17. Alternatively, a central processing unit (CPU) may count time from when the trailing edge of the preceding document is detected until when the leading edge of the next document is detected by the document edge sensor 17.

Accordingly, the information about the interval between these two documents is determined and then a reading mode of the document to be conveyed following the preceding document (next document) is determined.

An image of the next document is read in the first document reading mode when the interval between two documents (document interval) is a predetermined value or more. On the other hand, an image of the next document is read in the second document reading mode when the interval between two documents (document interval) is less than a predetermined value.

A micro processing unit (MPU) 301 (FIG. 7) makes such selection of a reading mode as described below. The specifications of the mechanism conveying documents are determined so that the document interval is constant. For example, circumferential speed difference between the first conveyance roller 7 and the separation roller 5, and the mechanical timer mounted on the pickup roller 3 and the separation roller 5 are determined for that purpose.

However, the document interval varies when the documents are conveyed as described above. The first main reason for the variation is slipping caused by the first conveyance roller 7, the separation roller 5 and the pickup roller 3. The second main reason is a variation of the sheet amount pulled out from the document stopper 20 to the separation pad. For example, the sheet amount pulled out from the document stopper 20 to the separation pad 4 is small when a plurality of plain sheets is separated. In contrast, the pull out amount of the sheet that has a high friction factor such as bond paper is larger when the sheet is pulled out of the document stopper 20 to the separate stopper 4. When the amount of the documents pulled out of the document stopper 20 to the separation pad 4 becomes larger, a distance (interval) between a preceding document and a next document becomes shorter than a predetermined distance.

The drive motor M keeps rotating and carrying out a conveyance operation for the next document while the document presence sensor 16 keeps detecting presence of documents being conveyed. The document S is conveyed toward the document discharge tray 18 by the second conveyance roller 9 when the document presence sensor 16 detects no presence of the documents, and the present document is discharged to the document discharge tray 18.

The discharged document S freely falls when the trailing edge of the document S passes through the second conveyance roller 9, moves on the main surface of the sloped document discharge tray 18. The trailing edge is held in the document holding surface 18a, and the document S is stored in the document discharge tray 18. The drive motor M is stopped after the motor has rotated a number of times equivalent to the pulse numbers which are sufficient for the trailing edge of the document to pass through the second conveyance roller 9. Thus, the reading operations are repeated until the document presence sensor 16 detects no presence of documents in the document reading conveyance unit 1.

As described above, by changing a document reading mode based on the document interval, occurrence of an error can be prevented even when a document such as the bond paper is used in which a document interval is prone to be shorter. Throughput of reading of plain paper documents can be improved by adjusting the setting (specification) of the document interval to a case where normally used plain paper documents are conveyed.

A predetermined value (threshold value) used for determining the document interval is based on an acceleration distance necessary for reading the documents in the first document reading mode (e.g., a value higher than the acceleration distance). Thus, the document interval is shorter and the document reading can be continued without errors by executing the second document reading mode even when the acceleration distance necessary for executing the first document reading mode cannot be secured.

Furthermore, the distance necessary for accelerating the documents can be shortened when the conveyance speed of the documents in the second document reading mode is lower than the conveyance speed of the documents in the first document reading mode. Therefore, occurrence of errors can be suppressed. Now, a reading control process will be described by referring to FIG. 6. The reading control process starts from detecting the documents placed on the document positioning plate 14.

Figure 6:
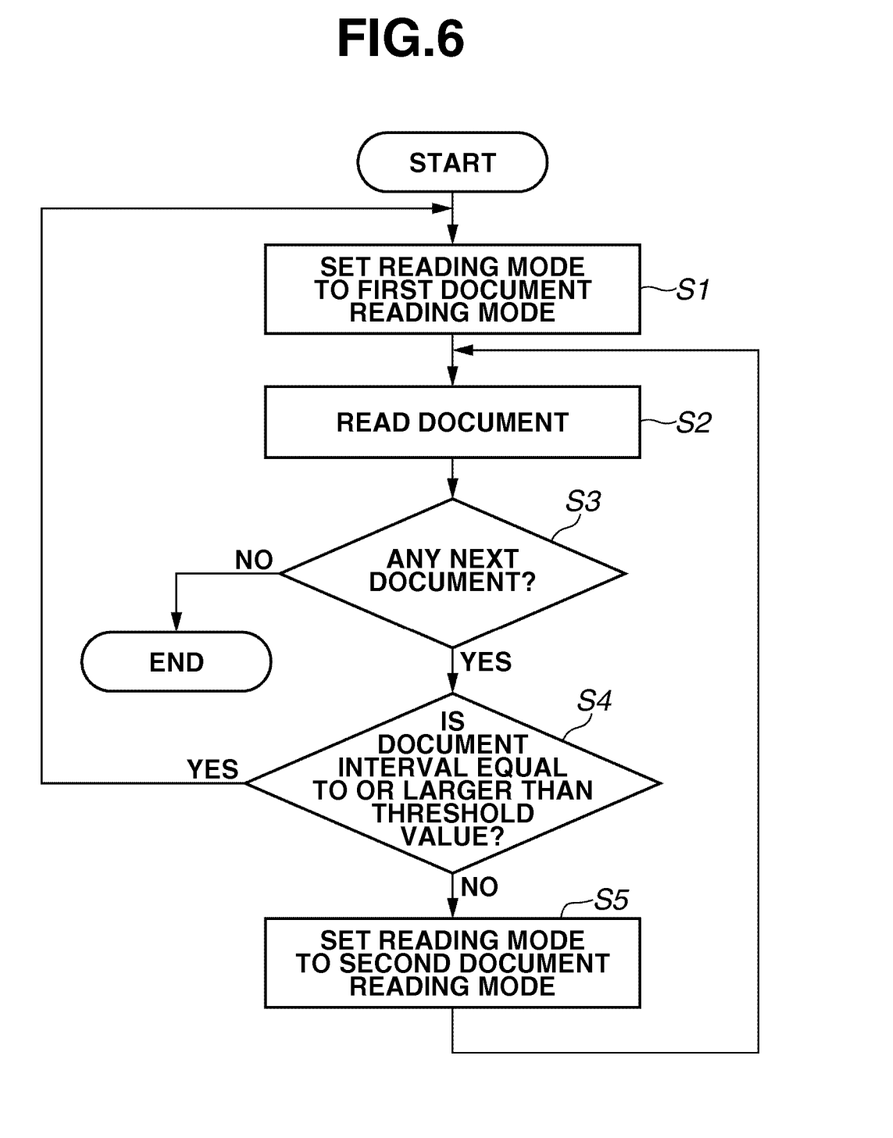
FIG. 6 is a flowchart illustrating a reading control process according to the exemplary embodiment of the present invention.

In step S1, a micro processing unit (MPU) 301 sets the reading mode to the first document reading mode. In step S2, the MPU 301 performs reading processing. One sheet of documents is read in this step. In step S3, the MPU 301 determines the presence of the next document. If it is determined that there is no next document (NO in step S3), the process ends. If it is determined that there is a next document (YES in step S3), the process proceeds to step S4. In step S4, the MPU 301 determines whether the document interval is equal to the threshold value or more. If it is determined that the document interval is equal to or larger than the threshold value (YES in step S4), the process returns to step S1. The MPU 301 starts reading the next document in step S2 with the reading mode unchanged from the first document reading mode.

On the other hand, if it is determined that the document interval is less than the threshold value (NO in step S4), the process proceeds to step S5. In step S5, the MPU 301 sets the reading mode to the second document reading mode. Then, process returns to step S2. The MPU 301 starts reading the next document in the second document reading mode. In a case where the document interval becomes equal to or larger than the threshold value, the MPU 301 performs control to change the reading mode in the reading operation of the subsequent documents from the second document reading mode to the first document reading mode. As described above, in a sequence that reads a plurality of the documents one by one, reading operations are executed by setting the reading mode based on the distance of the documents to be conveyed.

Further, an image can be generated in a thinning-out manner by skipping the image when the second document conveyance speed corresponding to the second document reading mode is set to one integer-th conveyance speed of the first document reading speed corresponding to the first document reading mode. Therefore, no image processing such as magnification of the read image data is necessary.

For example, the acceleration distance can be one half of the original distance by setting the second document conveyance speed corresponding to the second document reading mode to one half of the first document conveyance speed corresponding to the first document reading mode. Furthermore, the acceleration distance can be almost zero when the document conveyance speed in the second document reading mode is set in a self-start range.

Figure 10A:
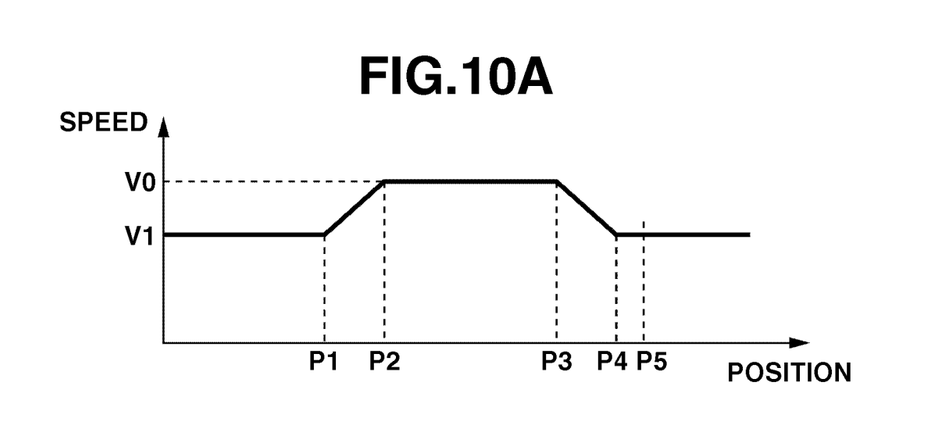
FIGS. 10A to 10C are timing charts each illustrating conveyance control processing according to the exemplary embodiment of the present invention.
Figure 10B:
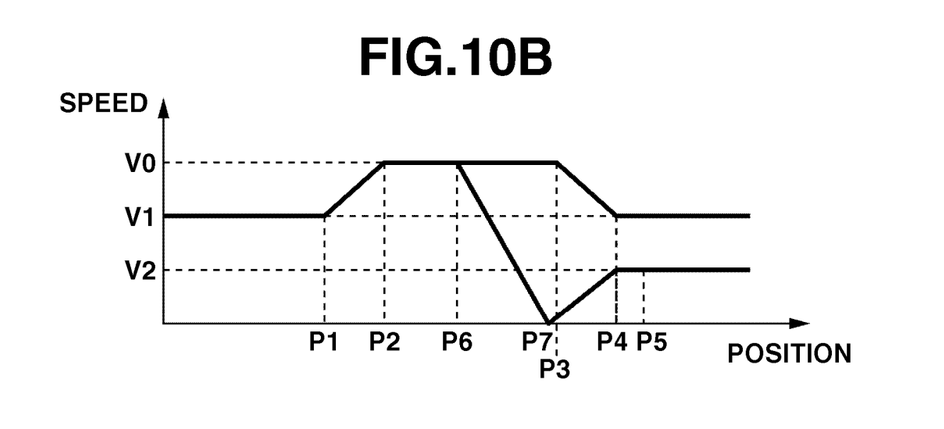
Figure 10C:
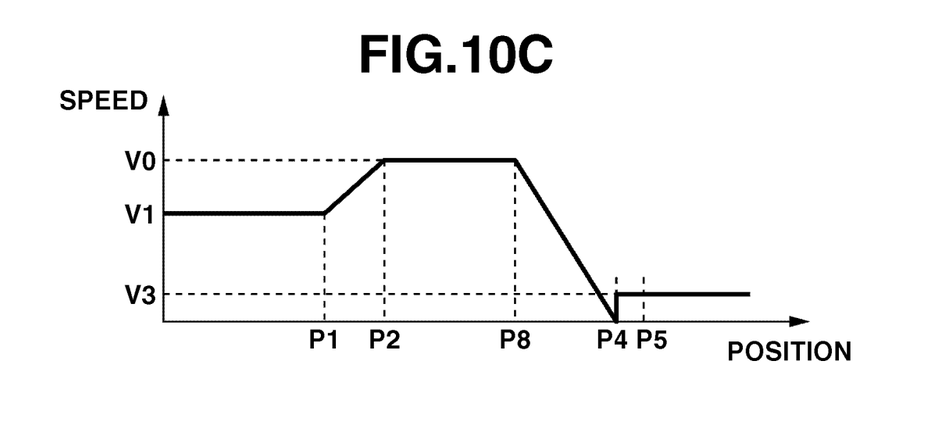

Conveyance control process of the document is described by referring to FIGS. 10A to 10C. FIGS. 10A to 10C are diagrams describing a relation between the position and the conveyance speed of the subsequent document to be conveyed following the preceding document.

P1 is a position corresponding to the timing when the trailing edge of the preceding document passes through the position of the contact image sensor 30. P2 is a position where a speed is accelerated up to the conveyance speed V0. A space between the position P1 and P2 is an acceleration control range where a speed is accelerated from a speed V1 to V0. P5 is a reading startup position.

FIG. 10A illustrates a control process in a case where the interval between the preceding document and the current document is equal to or larger than a threshold value. In this case, the document is conveyed at the speed V1 up to the position P1. The speed of conveyance is accelerated up to the speed V0 between the positions P1 and P2. The document is conveyed at the speed V0 from the position P2 to P3. The conveyance speed is lowered to the reading speed V1 in a zone from the position P3 to P4. The position P3 is a startup position in a deceleration control range. The document is conveyed at the speed V1 from the position P4. Thus, the conveyance speed is set to be faster than the reading speed in a zone where no reading is executed.

FIG. 10B illustrates a control process in a case where the interval between the preceding document and the current document is smaller than the threshold value. The control similar to that in FIG. 10A is executed up to the position P6. The speed is decelerated from the position P6 to P7 and the conveyance is in a suspension state at the position P7. Thereafter, acceleration control is executed from the position P7 to P4. From the position P4, the document is conveyed at the speed V2.

The position P6 is a position corresponding to the waiting timing until a reading instruction is transmitted from a host system. In a case where no reading instruction is received at the position P6, deceleration control is executed. In a case where the reading instruction is received after reaching the position P7, the acceleration control is executed up to the position P4.

Furthermore, the following control process may be executed. The control process similar to that in FIG. 10A may be executed in a case where the reading instruction is received before the document reaches the position P6. In other words, the document is conveyed from the position P6 to position P3 at the speed V0 and deceleration control is executed from the position P3 to the position P4. Then, the document is conveyed at the speed V1 from the position P4.

More specifically, a reading mode can be set based on the determined interval between the preceding document and the current document and the determined timing of receiving the reading instruction in step S4 as described in FIG. 6. In other words, the interval between the preceding document and the current document and whether the receiving of the reading instruction is delayed than predetermined timing are determined in step S4.

FIG. 10C illustrates another control process in a case where the interval between the preceding document and the current document is smaller than the threshold value. The position P8 is a position where the process waits for a reading instruction from the host system, compared with FIG. 10B. The deceleration control is executed from the position P8 to P4. The document is conveyed at the speed V3 in a case where a reading instruction is transmitted from the host system. The speed V3 is lower than V2, which requires no acceleration control. As described above, the reading operation is controlled based on an interval between the preceding document and the current document and the timing of receiving commands from the host system.

In the second document reading mode, time for reaching the predetermined document conveyance speed is, for example, processed by temporarily increasing a current applied to the drive motor M. By this process, torque generated by the motor M is increased, further an accelerating speed is gained, which enables the acceleration time to be shorter than that in the first document reading mode.

Thus, a distance necessary for the document acceleration up to the similar conveyance speed can be shortened. According to such control, the conveyance is normally accelerated with a low current to reduce the power consumption while a high current is applied for the conveyance only when the document interval becomes shorter, so that the power consumption can be suppressed as a whole.

Figure 8:
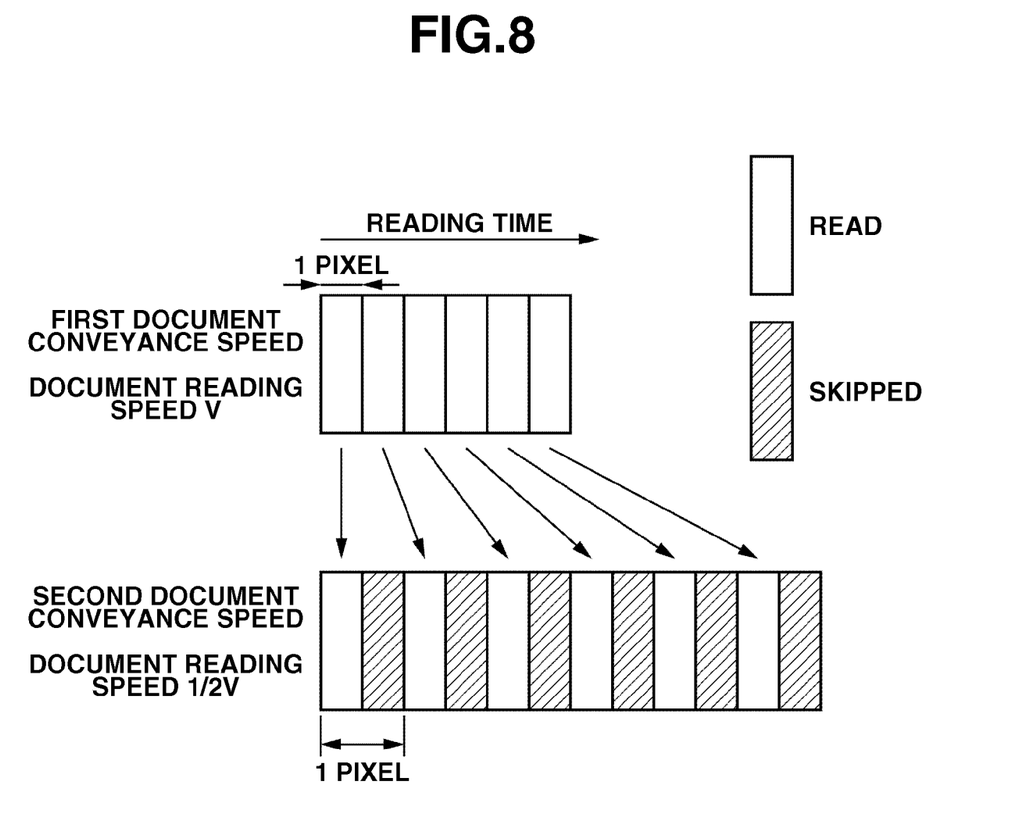
FIG. 8 is a diagram illustrating a reading control process according to the exemplary embodiment of the present invention.

Next, an image reading process in the reading mode is described by referring to FIG. 8. As illustrated in FIG. 8, time of reading an image equivalent to 1 line (1 pixel) at the second document conveyance speed is two times longer than the time of reading the image equivalent to 1 pixel at the first document conveyance speed when the second document conveyance speed is set to one half of the first document conveyance speed.

Therefore, 1 line unit (1 pixel) is read in the second reading mode at the second document conveyance speed and a thinning-out process is executed as FIG. 8 illustrates. In the thinning-out process, electric charges are discarded instead of transferring all charges accumulated in a charge accumulation unit to a processing unit at the rear stage. As illustrated in FIG. 8, a period of transferring the electric charges and a period of not transferring the electric charges (discarding the electric charges) are respectively set to the subsequent processing unit in every one half of the period, and the contact image sensor (CIS) 307 is controlled so that every one half of the periods are alternatively set. By such processing, for example, an image similar to the image obtained in the first document reading mode can be obtained without executing a magnification operation at the read image processing unit 309 (FIG. 7).

Figure 7:
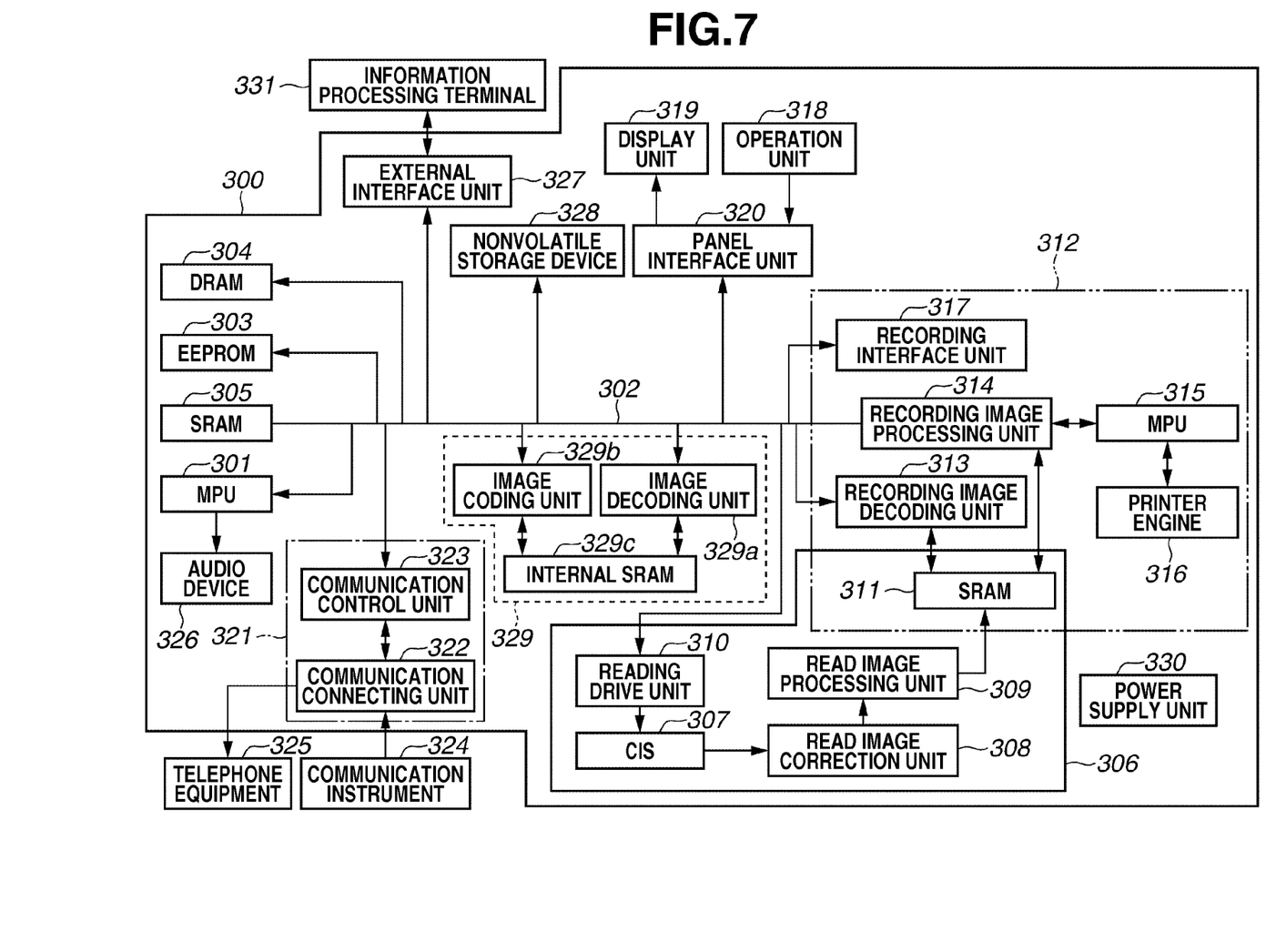
FIG. 7 is a control block diagram illustrating an image forming apparatus according to the exemplary embodiment of the present invention.

Next, control structure of an image reading apparatus according to the exemplary embodiment is described by referring to FIG. 7. The control structure includes a system control substrate primarily controlling the entire system of the apparatus, a printer control substrate primarily controlling a recording system, a power unit supplying power to the apparatus, and an operation control substrate on which operation panel keys and LEDs are mounted.

As an example of an image reading apparatus, a control structure of a facsimile apparatus 300 is described. The MPU 301 controls the entire apparatus via a system bus 302. The facsimile apparatus 300 includes an electrically erasable and programmable read only memory (EEPROM) 303 that stores a program code for operating the MPU 301, initial value data, table data, an image reading mode table, and a threshold value between a document interval, and a dynamic random access memory (DRAM) 304 used for an image buffer and an image memory temporarily holding data when transmitting and receiving the data with an information processing terminal 331. The information processing terminal 331 is, for example, a personal computer (PC). The DRAM 304 is used as a memory storing image data received via a communication unit 321, image data read from the reading unit 306, and image data transmitted from the information processing terminal 331 as a file. A static random access memory (SRAM) 305 is used as a user registration data area, and a work area. The DRAM 304 and the SRAM 305 are respectively protected from unexpected failure such as power stoppage by a battery backup.

The control structure includes a reading unit 306. The reading unit 306 has a contact image sensor (CIS) 307, a read image correction unit 308, a read image processing unit 309, a reading drive unit 310 and an SRAM 311. The CIS 307 corresponds to the contact image sensor 30 described in FIG. 1. The CIS 307 is moved by driving the reading drive unit 310 and the data is optically read by the CIS 307, converting the data into electric image signals. The read image correction unit 308 executes shading correction to the signals, and the read image processing unit 309 further executes an image processing operation to output highly fine image data. The SRAM 311 is used as a buffer when an image processing operation is executed.

The control structure includes an inkjet type recording unit 312. The recording unit 312 has the SRAM 311, a recording image decoding unit 313, a recording image processing unit 314, an MPU 315, a printer engine 316, and a recording interface unit 317. The recording image decoding unit 313 converts run-length type image data into raw image data. The recording image processing unit 314 performs image processing such as resolution-conversion, magnification of the image, smoothing of the image, and density correction, on the raw image data to convert the image data into highly fine image data. The SRAM 311 is used as a buffer when converting these data. The MPU 315 controls each operation of the inkjet type recording unit 312. The MPU 315 operates according to the program stored in a read only memory (ROM) (not illustrated). The recording interface unit 317 is an interface communicating closely between the MPU 315 and the MPU 301.

An operation unit 318 includes various key switches such as a numerical key pad for instructing operation of the apparatus and inputting various information. A display unit 319 includes liquid crystal displays (LCDs) and LEDs for displaying the apparatus state. A panel interface unit 320 is an interface that allows communication among the MPU 301, the operation unit 318 and the display unit 319.

A communication unit 321 performs line control. The communication unit 321 includes a communication connecting unit 322 such as a line connecting system, and communication control unit 323 such as a modem. The communication unit 321 is connected to a communication instrument 324 and telephone equipment 325. An audio device 326 includes speakers that notify the user of various states of the apparatus with a sound. An external interface unit 327 executes data transmission between the MPU 301 and the information processing terminal 331 and controls the apparatus from the information processing terminal 331. A nonvolatile storage device 328 is a nonvolatile memory in a large capacity used for storing image information. Information in the memory is not erased even when the power is turned off.

An image coding and decoding unit 329 for coding and decoding image data includes an image decoding unit 329a, an image coding unit 329b, an internal SRAM 329c. A power supply unit 330 supplies power to the apparatus. Operations according to the exemplary embodiment will be respectively described including PC scanning operation, copy operation, facsimile receiving operation, and printer operation.

PC Scanning Operation

The read image correction unit 308 performs processing such as shading correction on the document image information read by the CIS 307 of the reading unit 306. Further, the read image processing unit 309 performs binarization and image conversion processing on the image data and inputs the image data to the image coding unit 329b of the image coding/decoding unit 329. The input image data is rasterized on the internal SRAM 329c and compressively coded by the image coding unit 329b, and accumulated in the DRAM 304. Concurrently, management information of the image data is stored in the SRAM 305. The image coding data accumulated in the DRAM 304 is expansion-decoded by the image decoding unit 329a of the image coding and decoding unit 329 and rasterized on the internal SRAM 329c as image data. The rasterized image data is output to the information processing terminal 331 via the external interface unit 327.

In the PC operation, a reading instruction that triggers conveyance control for the reading processing is received from the information processing terminal 331 every time one sheet of the documents is read. For example, in a case where a plurality of the documents is conveyed in order for reading one by one, the information processing terminal 331 outputs a reading instruction to the image reading apparatus after transferring of the current document data to the information processing terminal 331 is completed. In a case where processing of the image data received from the information reading apparatus is delayed in the information processing terminal 331, timing of outputting an instruction to the image reading apparatus to read the next document may be delayed.

Copy Operation

The image information of the documents read by the CIS 307 of the reading 306 is subjected to shading correction in the read image correction unit 308, further subjected to binarization and image conversion processing and input to the image coding unit 329b of the image coding/decoding unit 329. The input image data is rasterized on the internal SRAM 329c, compressively coded by the image coding unit 329b and accumulated in the DRAM 304. Management information of the image data is concurrently stored in the SRAM 305. The image coding data accumulated in the DRAM 304 is expansion-decoded by the image decoding unit 329a of the image coding and decoding unit 329, and rasterized on the internal SRAM 329c as image data. The rasterized image data is print-output by the printer engine 316 under control of the MPU 315 after correction and image conversion processing is executed by the recording image processing unit 314.

Facsimile Receiving Operation

When incoming data is received, the received data is input to the communication control unit 323 through the communication connecting unit 322. Then the facsimile machine transmits and receives the procedure signals of the facsimile communication and starts receiving the image data. The image data is decoded by the communication control unit 323 and the decoded data is transferred to a receiving buffer of the DRAM 304 one byte at a time under control of the MPU 301 in response to input interrupting signals from the communication control unit 323. The received data transferred to the receiving buffer is expansion-decoded by the image decoding unit 329a of the image coding and decoding unit 329 for inspecting image errors and rasterized on the internal SRAM 329c as image data. After correction and image conversion processing is executed by the recording image processing unit 314, the rasterized image data is print-output by the printer engine 316 under control of the MPU 315.

Printer Operation

The information processing terminal 331 issues a command and a received parameter one byte at a time to the external interface unit 327. The command and the parameter received at the external interface 327 are transferred one byte at a time under control of the MPU 301 in response to input interrupting signals from the external interface unit 327. The commands store a command code for identifying each command, and a size of a subsequent received parameter. The received parameter includes set values necessary for executing operation as to each command and image data. The commands transferred to the received buffer of the DRAM 304 and the received parameter excluding the image data are processed by the MPU 301.

In a case where contents of the received parameter are image data, the code data or raw data included in the image data is processed according to image data type information which the previously received parameter indicates. The code data or the raw data is expansion-decoded by the image decoding unit 329a of the image coding and decoding unit 329 and rasterized on the internal SRAM 329c as image data. The rasterized image data is compression-coded by the image coding unit 329b of the image coding and decoding unit 329 and accumulated in the DRAM 304. At the same time, the administrative information of the image data is stored in the DRAM 304. After receiving the command, responses to the command and parameter to be sent are generated and issued.

The responses include OK response, NG response and BUSY response. The OK response indicates that the received command is accepted. The NG response indicates that the received command is not accepted because the command is in error. The BUSY response indicates that the received command is not presently accepted because of an operational reason. The parameter to be sent stores a result of transmission and printing, attributions of files and pages, apparatus information corresponding to the instructed commands, and requests for stopping and resending. The responses are set to the transmission buffer of the DRAM 304 by the MPU 301, transferred to the external interface unit 327 one byte at a time under control of the MPU 301 in response to input interrupting signals from the external interface unit 327, and then the responses are issued to the information processing terminal 331.

An exemplary embodiment may have a unit monitoring the remaining quantity of applicable buffer memory on the DRAM 304. In a case where a predetermined buffer is not present when the document reading is completed, the document interval may be determined and the document reading mode may be changed according to the document interval.

Other Exemplary Embodiment

The present exemplary embodiment is described as above. However, the processing performed when the reading mode is changed is not limited to the above description. For example, drive of a light source of the LED may be changed corresponding to a conveyance speed.

When the conveyance speed is changed, according to the present exemplary embodiment, the second conveyance speed is changed to one half of the first conveyance speed. However, the second conveyance speed may be changed to a different speed. For example, the second conveyance speed may be changed to one fourth, or one eighth of the first conveyance speed in reading the data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

what is claimed is:

1. An image reading apparatus comprising:
a feeding unit configured to sequentially feed at least a first document and a second document at constant interval;
a reading unit configured to read an image on a document;
a generating unit configured to generate image data based on the image read by the reading unit;
a transmission unit configured to transmit the image data generated by the generating unit to an external device;
a receiving unit configured to receive a predetermined instruction for reading the second document from the external device which received the image data corresponding to the first document;

a conveying unit arranged in an upstream side of the reading unit, configured to convey the document fed by the feeding unit to a reading position of the reading unit; and a control unit configured to stop conveying of the conveying unit such that the second document conveyed by the conveying unit does not arrive at the reading position in case where the predetermined instruction is not received by the receiving unit.

2. The image reading apparatus according to claim 1, wherein the reading unit includes an image sensor.

3. The image reading apparatus according to claim 1, wherein the control unit is configured to restart the conveying of the conveying unit such that the second document conveyed by the conveying unit arrives at the reading position in case where the predetermined instruction is received by the receiving unit after the control unit stopped conveying of the conveying unit.

4. The image reading apparatus according to claim 1, wherein the control unit determines whether the predetermined instruction is received by the receiving unit before a predetermined period of time has passed since the first document passed through the reading position.

5. The image reading apparatus according to claim 1, wherein the external device transmits the predetermined instruction based on a receipt of the image data of the first document.

* * * * *